Sept. 2, 1941.           B. H. SMITH                2,254,919
                    INDUCTOR GENERATOR
                    Filed June 8, 1938              2 Sheets-Sheet 1
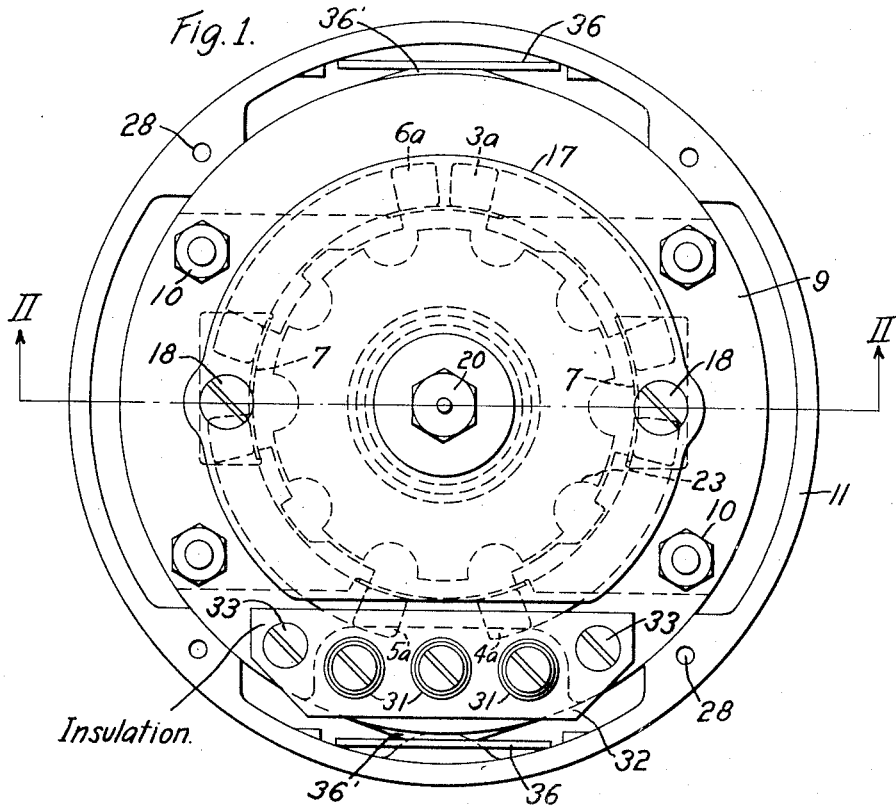
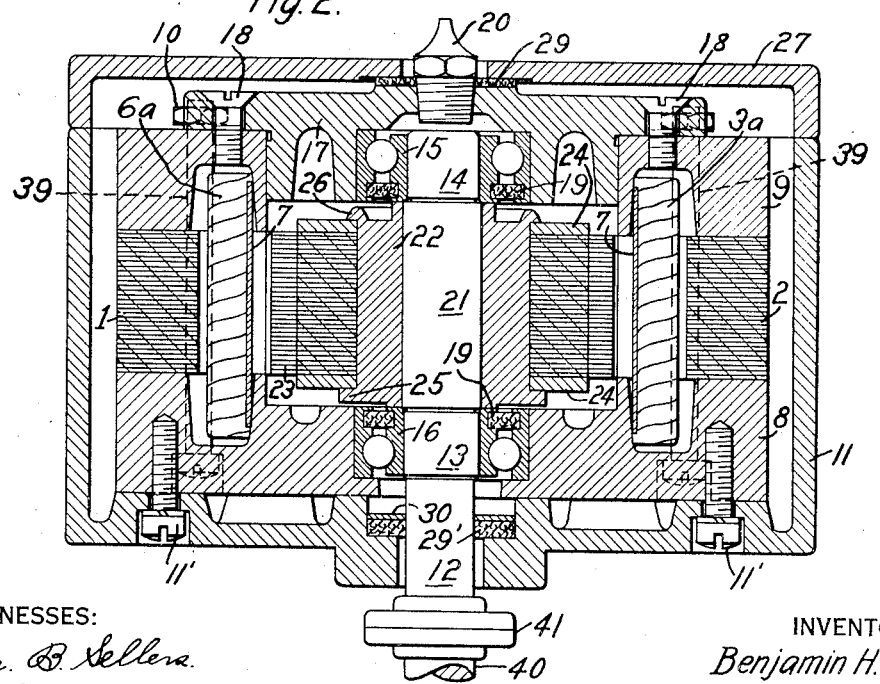
WITNESSES:                                    INVENTOR
Wm. B. Sellers.                            Benjamin H. Smith.
C. L. Freedman                             BY
                                               ATTORNEY

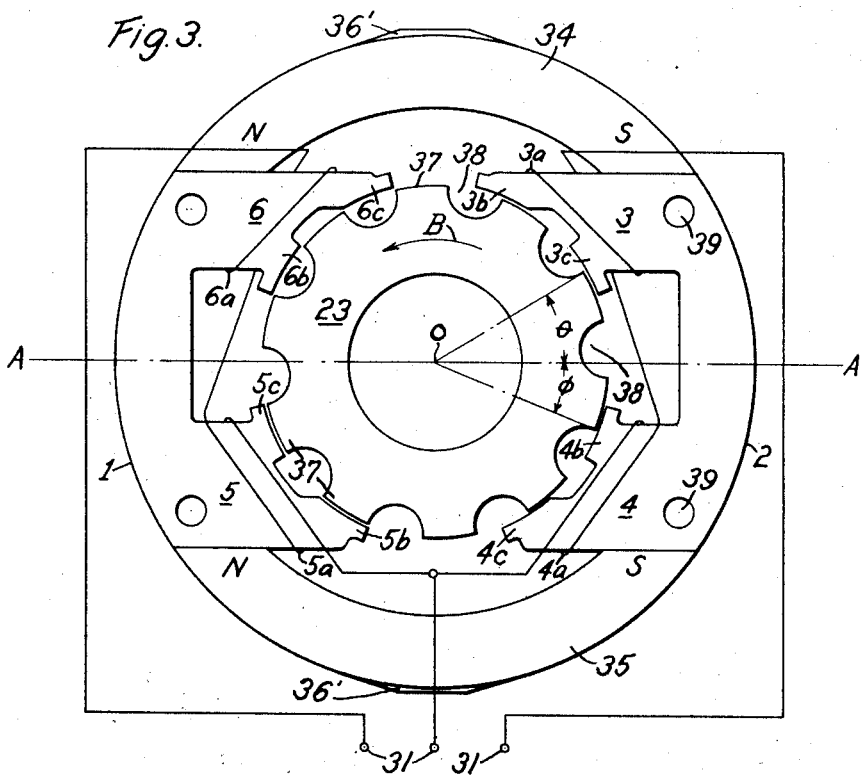
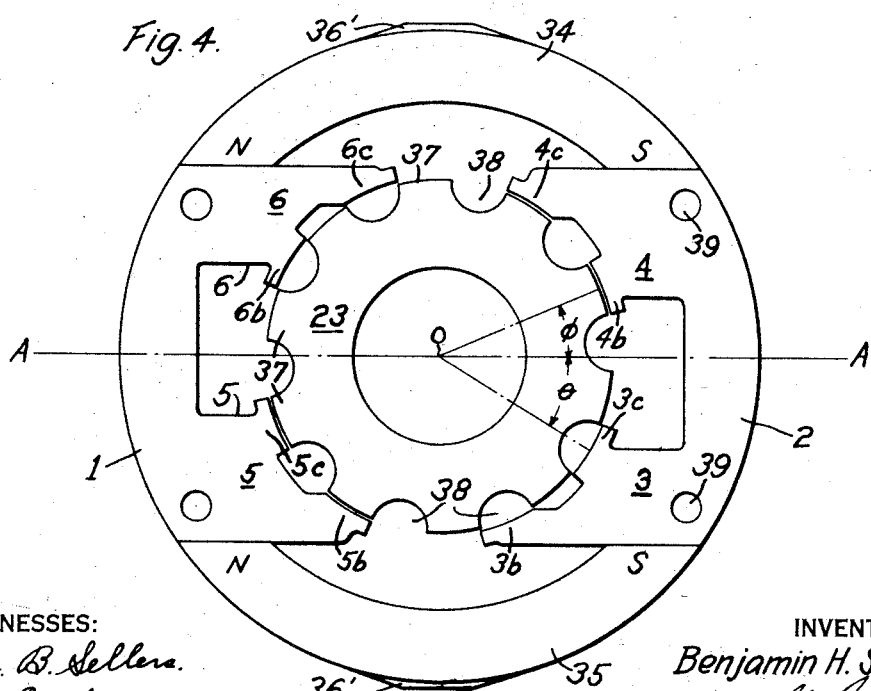

Patented Sept. 2, 1941

2,254,919

UNITED STATES PATENT OFFICE 2,254,919

INDUCTOR GENERATOR

Benjamin H. Smith, Bloomfield, N. J., assignor to Westinghouse Electric & Manufacturing Company, East Pittsburgh, Pa., a corporation of Pennsylvania Application June 8, 1938, Serial No. 212,439

18 Claims. (Cl. 171—252)

This invention relates to a generator, and it has particular relation to a generator of the inductor type.

Generators of the inductor type have found increasing use in many applications, such as tachometers, because of their simplicity and freedom from commutation troubles. In most of these applications, a single-phase generator is sufficient, but in others a polyphase generator is preferable. This may be exemplified by reference to the use of such a generator in electrical tachometers. If the tachometer is to indicate speed only a single-phase tachometer may be employed, but if the tachometer is to indicate direction of rotation as well as speed, a single-phase generator ordinarily will not suffice and a polyphase generator would be employed.

In the inductor generators heretofore available, one design was provided for single-phase use and a different design was provided for polyphase applications. This required an unusually large number of parts with a resultant increase in the number of tools required and in the procedures necessary for constructing the different generators.

I have found it possible to construct a compact single-phase generator which may be converted readily into a polyphase generator without requiring any change in parts whatever. In accordance with a specific embodiment of my invention, an inductor generator is provided with a plurality of stator poles and an inductor element mounted for rotation with respect to these poles. Certain of these poles are mountable in either of two positions. In one of the positions, the flux passing through these poles is in phase with flux passing through the remainder of the poles. In the second position, the flux passing through the adjustable poles is displaced in phase from the flux passing through the remainder of the poles by a suitable angle, such as 90° to provide a polyphase or two-phase output.

It is, therefore, an object of my invention to provide a compact and efficient inductor generator.

It is another object of my invention to provide a single-phase inductor generator which may be converted into a polyphase generator.

Further objects of my invention will be apparent from the following description taken in conjunction with the accompanying drawings, in which:

Figure 1 is a view in top plan of a polyphase inductor generator embodying my invention with the cover removed;

Fig. 2 is a view in section taken along the line II—II of Fig. 1 showing the cover in place;

Fig. 3 is a skeleton view showing the relations of the electrical and magnetic parts of the inductor generator shown in Figs. 1 and 2; and Fig. 4 is a skeleton view showing the relationship of the magnetic parts of the inductor generator of Figs. 1 to 3, adjusted for single-phase operation.

Referring to the drawings, I have shown an inductor generator comprising a plurality of stator laminations 1 and 2 provided with pole elements 3, 4, 5 and 6. Each of the pole elements is provided with a separate winding 3a, 4a, 5a and 6a which is held in place by means of wedges 7 engaging lips on the pole elements. If desired, the windings may be form wound. The stator laminations are firmly secured between two rings 8 and 9, by means of through bolts 10, and the complete structure is retained in a housing 11 by means of machine screws 11'.

A rotor assembly is mounted for rotation within the stator on a shaft 12 which is provided with two raised journals 13 and 14 for receiving the inner races of two ball bearings 15 and 16. The outer race of the bearing 16 is carried by the ring 8 and the outer race of the bearing 15 is carried by an end plate 17 which is fastened to the ring 9 by machine screws 18. The bearings 15 and 16 preferably are provided with grease-retaining members 19. Lubrication for the bearings is provided by a grease gun fitting 20 which is screwed into a tapped opening in the end plate 17. Grease may be conducted from the grease gun fitting 20 to the bearing 16 by hollow drilling the shaft 12. The shaft 12 is provided with a raised central portion 21 which carries a hub 22. The hub may be secured to the raised portion 21 in any suitable way, as by making these a press fit. The rotor assembly includes a stack of magnetic laminations 23 which are retained between rings 24. One of the rings 24 engages a collar 25 formed on the hub 22, and the other of the rings 24 is secured by means of a lip 26 forced or spun over the ring from the hub 22. A cover 27 for the housing 11 is held in place by machine screws (not shown) passing through the cover and threaded into tapped openings 28 provided in the housing. Resilient felt washers 29 and 29' may be provided for completely sealing the housing and cover to prevent entrance of dirt into the generator. A split washer 30 is shown above the lower resilient washer 29'.

Terminals 31 for the generator are mounted on an insulating panel 32 which is secured to the ring 9 by means of machine screws 33. Portions of the end plate 17 and the ring 9 are cut away to provide clearances for the insulating panel 32 and the terminals. The terminals 31 project through openings in the cover 27 and may be sealed against the entrance of dirt by means of washers similar to the resilient washer 29.

As shown more clearly in Fig. 3 of the drawings, a pair of permanent magnets 34 and 35 have their north poles abutting against the stator laminations 1 and their south poles abutting against the stator laminations 2. These permanent magnets are held in place by means of wedges 36 as shown in Fig. 1, which may engage bosses 36' formed on the permanent magnets.

The construction of the stator laminations 1 and 2 and the construction of the rotor laminations 23 are clearly shown in Figs. 3 and 4. The rotor laminations are provided with a plurality of magnetic teeth or projections 37 equal in area and separated by recesses or spaces 38 also of equal area. Although I prefer to leave the spaces 38 as shown, I may fill them with a non-magnetic material, such as phenol formaldehyde resin. Each of the pole elements 3, 4, 5 and 6 is provided with a plurality of pole faces 3b, 3c, 4b, 4c, 5b, 5c, 6b, 6c, adjacent the rotor laminations 23. These pole faces are substantially equal in width to the magnetic teeth 37 and spaces 38. The drawings show a rotor having ten magnetic teeth 37 associated with a stator having eight pole faces to form a compact and efficient generator.

The operation of the construction thus far described is apparent. The permanent magnets 34 and 35 tend to force magnetic flux to flow from the pole elements 6 and 5 to the pole elements 3 and 4 across the rotor laminations 23. As a tooth 37 sweeps past a pole face, the flux passing through the corresponding pole increases gradually until the projection 37 is in alignment with the pole face, after which the flux decreases. This fluctuation of flux induces a corresponding fluctuating voltage in the winding surrounding the pole element, and the fluctuating voltage appears at the terminals of the generator.

Assuming that the rotor assembly rotates counter-clockwise as shown by the arrow B, the arrangement of parts in Fig. 3 is such that a polyphase output is delivered by the generator. It will be noted, for example, that the pole faces 5c and 4b are displaced relative to adjacent rotor projections 37. This displacement is such that the flux passing through the pole face 5c lags the flux passing through the pole face 4b by 90 electrical degrees. Consequently, the voltage induced in the winding 5a by this flux lags the voltage induced in the winding 4a by 90 electrical degrees. These windings are connected to the terminals 31 as shown in Fig. 3. Similarly, it will be noted that the flux passing through the pole element 6 lags the flux passing through the pole element 3 by 90 electrical degrees, and for this reason, the winding 6a may be placed in series with the winding 5a to deliver one phase of the generator output, and the winding 3a may be placed in series with the winding 4a to deliver a second phase of the generator output. It should be noted also that the flux passing through the pole element 5 is displaced from the flux passing through the pole element 6 by 180 electrical degrees. For this reason, the windings 6a and 5a are reversed electrically with respect to each other, in order to bring the voltages and currents induced therein into proper relationship. Similarly, the windings 3a and 4a are reversed relative to each other.

In order to permit the conversion of the generator shown in Fig. 3 into a single-phase generator, I so mount either or both of the stator laminations 1 and 2 that they may be reversed about an axis A—A. Both the mounting holes 39 which receive the through bolts 10 and the ends of the stator laminations 1 and 2 are symmetrical about this axis, so that rotation of the stator laminations about the axis does not result in any disturbance of the remaining parts of the generator. A phase shift of the flux passing through each of the pole elements upon reversal of the stator laminations about the axis A—A is secured by a proper location of the pole faces with respect to the axis A—A. For example, the center of the pole face 3c is displaced from the axis A—A around the center of curvator O by an angular distance $\theta$, which is 1¾ times the angular width of the pole face 3c. When the stator laminations 2 are rotated about the axis A—A the pole face 3c is moved from the position shown in Fig. 3 to the position shown in Fig. 4, in which the pole face is below the axis A—A. The angular displacement of the pole face as a result of this movement, is equal to 2$\theta$, or 3½ times the angular width of the pole face. This movement brings the pole face 3c into phase with the pole face 6b and the windings around the pole elements 3 and 6 may now be connected either in series or in parallel to produce a single-phase output. Similarly, the pole face 4b is displaced from the axis A—A by an angular distance $\phi$, which is 1¼ times the width of the pole face. Consequently, when the pole face 4b is moved from the position shown in Fig. 3 to the position shown in Fig. 4, it will be displaced by an angular distance 2$\phi$, which is 2½ times the angular width of the pole face. This movement is sufficient to bring the flux passing through the pole element 4 into phase with the flux passing through the pole element 5 and the coils surrounding these two pole elements may be connected either in series or in parallel to supply a single-phase output.

In Fig. 4, it will be noted that the flux passing through the pole elements 4 and 5 is displaced 180 electrical degrees from the flux passing through the pole elements 3 and 6. Consequently, in order to connect all four of the coils in series, parallel or series-parallel arrangements, the coils surrounding the pole elements 4 and 5 should be reversed electrically with respect to the coils surrounding the pole elements 3 and 6. The movements of the pole faces 3b and 4c may be analyzed in the same way, and in each case, it will be found that the movement is such that the flux passing through the pole face on reversal of the stator lamination is displaced by 90 electrical degrees. Although Fig. 4 shows the laminations 2 reversed with respect to Fig. 3, it is obvious that the stator laminations 1 could be reversed instead of the laminations 2 with the same result.

In Fig. 3, the coils are so connected that the supply from the terminals 31 is a three-wire, two-phase supply. If separate terminals are brought out for each coil, it is clear that a quarter phase supply may be provided. However, for most applications, the three-wire supply shown in Fig. 3 is adequate.

In the laminations shown, it will be noted that the displacement of each pole face from the axis A—A is equal to ¼ of a pole face width multiplied by an odd whole number. This displacement produces the required 90° shift of flux in the reversed positions of the stator laminations. It is clear that other shifts may be provided in a similar way. For example, if each pole face is displaced from the axis A—A by a distance such that rotation of the pole face about its axis displaces the flux passing therethrough by 60 electrical degrees, a three-phase generator may be built incorporating my invention. In this case, of course, an additional stator lamination group would be provided.

The flux passing through the pole faces 3b and 3c is displaced 180 electrical degrees from the flux passing through the pole faces 4b and 4c. Similarly, the flux passing through the pole faces 5b and 5c is displaced 180 electrical degrees from the flux passing through the pole faces 6b and 6c. Because of this displacement, the flux supplied by the permanent magnets 34 and 35 does not fluctuate substantially during operation of the generator. In other words, the reluctance of the magnetic path between the stator lamination 1 and the stator lamination 2 is substantially unchanged during rotation of the rotor laminations 23, the magnetic flux being shifted from pole face to pole face instead of being abruptly interrupted. This is particularly advantageous in generators employed in installations requiring a high degree of accuracy. Fluctuations of magnetic flux in the permanent magnets 34 and 35 are undesirable because of the errors resulting from the magnetic losses in the iron of the permanent magnets.

It is believed that the operation of the generator embodying my invention will be apparent from the foregoing description. With the generator constructed as shown in Figs. 1, 2 and 3, a two-phase output is provided. By simply reversing either of the groups of stator laminations 1 or 2 about the axis A—A and suitably reconnecting the coils, the machine provides a single-phase output.

The exact construction of the generator is subject to many variations. For some installations the dust proof casing may be omitted. Equivalent means and methods may be employed for attaching and mounting the various parts. If desired, one of the permanent magnets 34, 35 may be omitted. Instead of the exact number of pole faces shown, a single pole face may be provided for each of the pole units or a larger number may be provided for each of the pole units. In any case, the main problem is to make the best use of the space available for the generator, and I have found that the particular proportions and parts shown result in a compact and efficient generator.

When employed as a tachometer generator, the rotor may be connected to a shaft 40, (Fig. 2) the speed of which is to be measured, through a suitable coupling 41, and the output of the generator may be conducted to a suitable indicating instrument. However, instead of rotating the rotor assembly, this may be held fixed and the stator assembly may be rotated. In this case, it would be necessary to connect the terminals 31 to slip rings and employ brushes for delivering the output of the generator to a stationary indicating instrument.

It is obvious that many modifications of my invention are possible. Therefore, I do not desire my invention to be restricted except as required by the appended claims when interpreted in view of the prior art.

I claim as my invention:

1. In a generator, a plurality of coils, a magnetic member positioned within each of said coils, and means for passing a fluctuating magnetic flux through said members, at least one of said magnetic members being adjustable for varying the phase relationship of the flux passing therethrough relative to the flux passing through the remainder of the magnetic members.

2. In an inductor generator, a plurality of pole assemblies and a plurality of magnets alternately mounted around a common axis, two of said magnets having ends of similar polarity adjacent one of said pole assemblies, said pole assemblies having pole faces substantially equidistant from said axis, coils associated with said pole assemblies and means for varying the flow of flux from said magnets through said pole assemblies, at least one of said pole faces being mountable in either of two positions for varying the phase of said flux variation in at least one of said coils.

3. In a generator, a first member and a second member, said members being relatively rotatable, a first pole element mountable on said first member in either of two positions, a second pole element, means for passing magnetic flux through said pole elements including means on said second member for periodically varying said magnetic flux during uniform relative rotation of said members, the flux variation in the first pole element in one of its positions being displaced in phase from the flux variation in said first pole element in its other position by 90 electrical degrees, a coil around each of said elements, said coils being connectable to supply a single-phase or polyphase output in accordance with the position of said first pole element.

4. In a dynamo, a magnetic pole unit, a supporting structure for said pole unit, and means for producing a fluctuating magnetic flux in said pole unit, said pole unit being positionable in its mounting on said supporting structure in any of a plurality of positions for varying the phase of the magnetic flux passing therethrough.

5. In a dynamo, a pair of members relatively rotatable about a center line of rotation, a pole element on one of said members, and means for producing a varying magnetic flux on relative rotation of said members, said pole element being reversible on its supporting member about an axis passing at right angles through said center line of rotation, the magnetic flux passing through said pole element in one of its positions being out of phase with the magnetic flux passing therethrough in the reversed position of said pole element.

6. In a generator, a first member and a second member, said members being relatively rotatable, a plurality of pole elements on said first member, a plurality of magnetic portions spaced by non-magnetic portions on said second member, said portions being of substantially the same size, means for selectively mounting at least one of said pole elements in a first position on said first member having a certain relationship relative to the nearest of said portions, or in a second position having a different relationship relative to the nearest of said portions.

7. In a generator, a cylindrical member having a plurality of magnetic areas spaced by non-magnetic areas uniformly positioned around its periphery, said areas being of substantially the same size, a pole element having a pole face, a supporting structure for said pole element, said supporting structure and cylindrical member being mounted for relative rotation about a center line of rotation wherein said areas successively pass said pole face, mounting means symmetric relative to an axis passing at right angles through said center line of rotation for positioning said pole element on said supporting structure, said pole face being displaced around said center line of rotation from said axis by an angular distance which is substantially equal to one-fourth the angular width of said pole face measured around said center line of rotation multiplied by an odd whole number.

8. In a generator, a first member and a second member, said members being relatively rotatable about a center line of rotation, a pole element having a pole face, means for passing magnetic flux through said pole element including means on said second member for periodically varying said magnetic flux on relative uniform rotation of said members, said pole face being so positioned relative to an axis passing at right angles through said center line of rotation that reversal of said pole element about said axis alters the phase relationship of the magnetic flux passing therethrough, and means for securing said pole element in either its normal or reversed position.

9. In a generator, a first member and a second member, said members being relatively rotatable, a magnetic pole element mountable on said first member in either of two positions, and means for passing magnetic flux through said pole element including means on said second member for varying periodically said magnetic flux during uniform relative rotation of said members, said positions being spaced by a distance sufficient to displace the magnetic flux passing through said pole element in its two positions by 90 electrical degrees.

10. In a pole assembly, a supporting structure, a pole element having a pole face carried by said structure, said pole element being mountable in any of a plurality of positions on said structure, said pole face in said positions being equally spaced from an axis, the angular width of said pole face about said axis being an aliquant of the angular distance about said axis between two positions of said pole face.

11. In a pole assembly, a supporting structure, a pole element having an arcuate pole face, and mounting means for mounting said pole element in either of two positions symmetrical about an axis passing at right angles through the center line of curvature of said pole face, said pole face being angularly displaced around said center line of curvature from said axis by an angular distance equal to one-fourth of the angular width of the pole face multiplied by an odd whole number.

12. In a pole assembly, a supporting structure, a magnetic pole unit comprising a pair of pole elements each having at least one arcuate pole face and a connecting member between said pole elements, all of said pole faces having a common center line of curvature, said pole unit being reversible about an axis passing at right angles through said center line of curvature, and means for securing said pole unit on said supporting structure in either of its reversed positions, at least one of said pole faces being displaced from said axis about said center line by an angular distance less than the product of the angular width of a pole face multiplied by a whole number.

13. In an inductor generator, a first member comprising two spaced pairs of spaced pole elements each having a plurality of pole faces, a magnet for supplying flux to said pole elements, a second member, said members being relatively rotatable, a plurality of magnetic teeth separated by spaces of substantially equal area on said second member positioned for movement past said pole faces, the opposed surfaces of said pole faces and magnetic teeth being substantially equal in area, said pole faces being so positioned that when each pole face is opposite one of said magnetic teeth, another pole face is opposite one of said spaces.

14. In an inductor generator, a first member having a pole element provided with a plurality of pole faces and means for supplying magnetic flux thereto, a second member, said members being relatively rotatable, a plurality of magnetic projections separated by spaces on said second member positioned for movement past said pole faces for varying the magnetic flux passing therethrough, said pole faces and projections being so positioned that when one of said pole faces is opposite one of said projections, a second one of said pole faces is opposite one of said spaces, and supporting means for said pole element, said pole element being adjustable for varying the phase of magnetic flux passing through said pole faces.

15. In an inductor generator, a cylindrical structure, an annular magnetic structure surrounding said cylindrical structure comprising a plurality of alternate magnetic elements and permanent magnets, the magnet ends adjacent one of said magnetic elements being of the same polarity, a plurality of magnetic projections on said cylindrical structure, a plurality of pole faces on said magnetic elements, said structures being relatively rotatable for moving said magnetic projections past said pole faces for fluctuating magnetic flux supplied thereto by said permanent magnets, and means for reversibly mounting one of said magnetic elements between adjacent permanent magnets so that the ends thereof may be exchanged, the portion of the pole faces on said one magnetic element being so located that the magnetic fluxes passing therethrough in the two positions thereof differ in phase.

16. In an inductor generator, a cylindrical structure, an annular magnetic structure surrounding and rotatable relative to said cylindrical structure, said magnetic structure comprising alternate magnetic elements and permanent magnets, the magnet ends adjacent one of said magnetic elements being of the same polarity, a pair of pole elements depending from each of said magnetic elements towards said cylindrical structure, said pole elements being spaced around said cylindrical structure, a coil around each of said pole elements, a plurality of uniformly spaced magnetic projections on said cylindrical structure positioned for movement past said pole elements during relative rotation of said structures for fluctuating magnetic flux supplied to said pole elements from said magnets, and a plurality of pole faces on each of said pole elements adjacent said cylindrical structure, the opposed surfaces of said pole faces and projections having substantially equal dimensions measured in the direction of said movement, said pole faces being so positioned that the magnetic fluxes in each of said pairs of pole elements are displaced in phase by 180 electrical degrees.

17. In an inductor generator, a first member comprising a pair of spaced pole elements each having a plurality of pole faces, a magnet for supplying flux to said pole elements, a second member, said members being relatively rotatable, a plurality of magnetic teeth separated by spaces of substantially equal area on said second member positioned for movement past said pole faces, the opposed surfaces of said pole faces and magnetic teeth being substantially equal in area, said pole faces being so positioned that when each pole face is opposite one of said magnetic teeth, another pole face is opposite one of said spaces, and said magnetic teeth exceeding in number said pole faces by two.

18. In an inductor generator, a cylindrical structure, an annular magnetic structure surrounding and rotatable relative to said cylindrical structure, said magnetic structure comprising two spaced magnetic elements and permanent magnet means extending therebetween, said magnetic elements having opposite magnetic polarities, a pair of pole elements depending from each of said magnetic elements towards said cylindrical structure, said pole elements being spaced around said cylindrical structure, a coil around each of said pole elements, a plurality of uniformly spaced magnetic projections on said cylindrical structure positioned for movement past said pole elements during relative rotation of said structures for fluctuating magnetic flux supplied to said pole elements from said magnets, and a plurality of pole faces on each of said pole elements adjacent said cylindrical structure, the opposed surfaces of said pole faces and projections having substantially equal dimensions measured in the direction of said movement, said pole faces being so positioned that the magnetic fluxes in each of said pairs of pole elements are displaced in phase by 180 electrical degrees, and said magnetic projections exceeding in number said pole faces by two.

BENJAMIN H. SMITH.